(12) United States Patent  
Gandhi

(10) Patent No.: US 9,267,563 B2  
(45) Date of Patent: Feb. 23, 2016

(54) FRICTIONAL CONTROL SYSTEM

(71) Applicant: Toyota Motor Engineering & Manufacturing North America, Inc., Erlanger, KY (US)

(72) Inventor: Umesh N. Gandhi, Farmington Hills, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 96 days.

(21) Appl. No.: 14/041,144

(22) Filed: Sep. 30, 2013

(65) Prior Publication Data

US 2015/0090544 A1 Apr. 2, 2015

(51) Int. Cl.

| | |
|---|---|
| *F16F 9/32* | (2006.01) |
| *F16D 69/02* | (2006.01) |
| *F16D 65/14* | (2006.01) |
| *F16D 1/08* | (2006.01) |
| *F16D 28/00* | (2006.01) |
| *F16D 69/00* | (2006.01) |
| *F16D 121/28* | (2012.01) |
| *F16D 121/18* | (2012.01) |

(52) U.S. Cl.  
CPC .............. *F16D 69/02* (2013.01); *F16D 1/0829* (2013.01); *F16D 28/00* (2013.01); *F16D 65/14* (2013.01); *F16D 2069/005* (2013.01); *F16D 2121/18* (2013.01); *F16D 2121/28* (2013.01)

(58) Field of Classification Search  
CPC .............. F16F 7/095; F16F 7/00; F16F 7/09; F16F 7/08; F16F 7/082; F16F 2230/0041; F16F 2230/052; F16D 1/0829; F16D 28/00; F16D 64/02; F16D 65/14; F16D 2069/005; F16D 2121/28; F16D 2121/18  
USPC ................... 188/300, 271, 280, 272, 251 A; 252/62.9 R, 182.11  
See application file for complete search history.

(56) References Cited

U.S. PATENT DOCUMENTS

| | | | |
|---|---|---|---|
| 6,193,303 B1 * | 2/2001 | Urushiyama et al. .... | 296/187.03 |
| 6,378,671 B1 * | 4/2002 | Carlson ...................... | 188/267.2 |
| 6,910,714 B2 * | 6/2005 | Browne et al. ............. | 280/753 |
| 7,401,845 B2 * | 7/2008 | Alexander et al. ........ | 296/187.01 |
| 7,669,918 B2 | 3/2010 | Buravalla et al. | |
| 7,787,646 B2 | 8/2010 | Pelrine et al. | |
| 8,164,232 B2 * | 4/2012 | Kornbluh et al. ............ | 310/309 |
| 8,167,363 B2 * | 5/2012 | Gandhi .................... | 296/203.01 |
| 2006/0225973 A1 * | 10/2006 | Dimig et al. .................. | 188/161 |
| 2007/0092685 A1 * | 4/2007 | Yamazaki ....................... | 428/68 |
| 2008/0197674 A1 * | 8/2008 | Browne et al. ............ | 296/193.11 |
| 2009/0045042 A1 | 2/2009 | Browne et al. | |
| 2009/0047197 A1 | 2/2009 | Browne et al. | |
| 2010/0264693 A1 * | 10/2010 | Gandhi .................... | 296/187.01 |

* cited by examiner

*Primary Examiner* — Pamela Rodriguez  
(74) *Attorney, Agent, or Firm* — Christopher G. Darrow; Darrow Mustafa PC

(57) ABSTRACT

A friction control device includes a slotted shield through which an active material layer selectively expands. A system includes a second component movable with respect to a first component; a friction control device between the first component and the second component, the friction control device including: an active material layer; and a slotted shield through which the active material layer selectively expands through. A method for controlling a frictional interface between a first component and a second component, includes selectively expanding an active material through a multiple of slots.

20 Claims, 6 Drawing Sheets

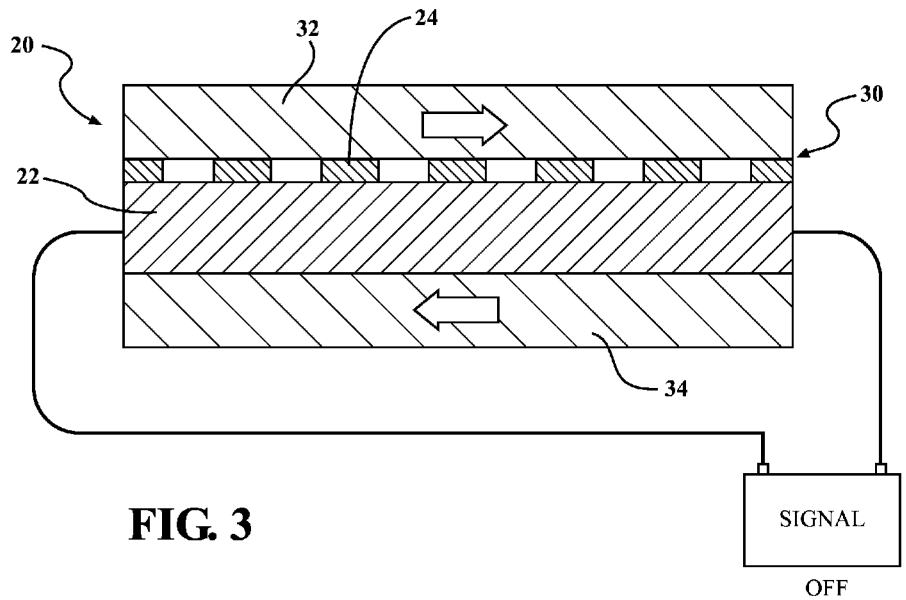
FIG. 3
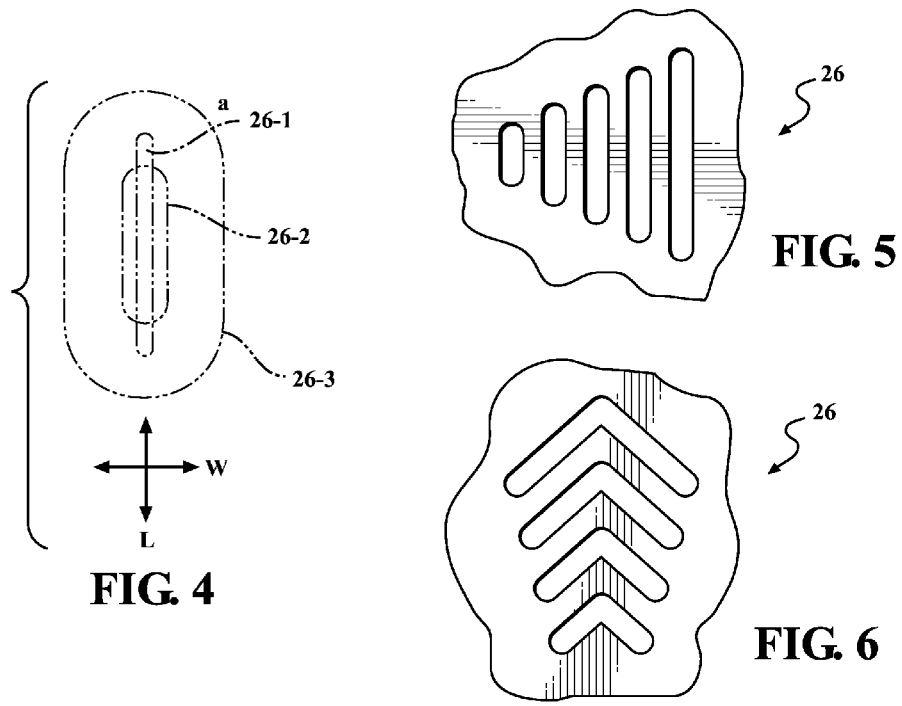
FIG. 4
FIG. 5
FIG. 6

FRICTIONAL CONTROL SYSTEM

BACKGROUND

The present disclosure relates generally to methods and devices for controlling and varying frictional force levels at an interface.

Various systems utilize actuators to control friction at an interface such as within a clutch, brakes, bearings, suspension, steering and others. Such actuators may be complicated and relatively heavy in weight. Further, other operational or functional requirements such as limited packaging space may prevent effective control of frictional force levels.

SUMMARY

A friction control device according to one disclosed non-limiting embodiment of the present disclosure includes an active material layer and a slotted shield with a multiple of slots through which at least a portion of the active material layer is selectively operable to expand.

A system according to another disclosed non-limiting embodiment of the present disclosure includes a second component movable with respect to a first component; a friction control device between the first component and the second component, the friction control device including: an active material layer; and a slotted shield with a multiple of slots through which at least a portion of the active material layer is selectively operable to change a frictional force between the first component and the second component.

A method for controlling a frictional interface between a first component and a second component, according to another disclosed non-limiting embodiment of the present disclosure includes selectively expanding an active material through a multiple of slots to change a frictional force between the first component and the second component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is a schematic view of the friction control device in a deactivated condition;

FIG. 4 is a schematic view of a friction control device example slot geometry for the friction control device;

FIG. 5 is a schematic view of a slot pattern for the friction control device according to one disclosed non-limiting embodiment;

FIG. 6 is a schematic view of a slot pattern for the friction control device according to another disclosed non-limiting embodiment;

DETAILED DESCRIPTION

Figure 1:
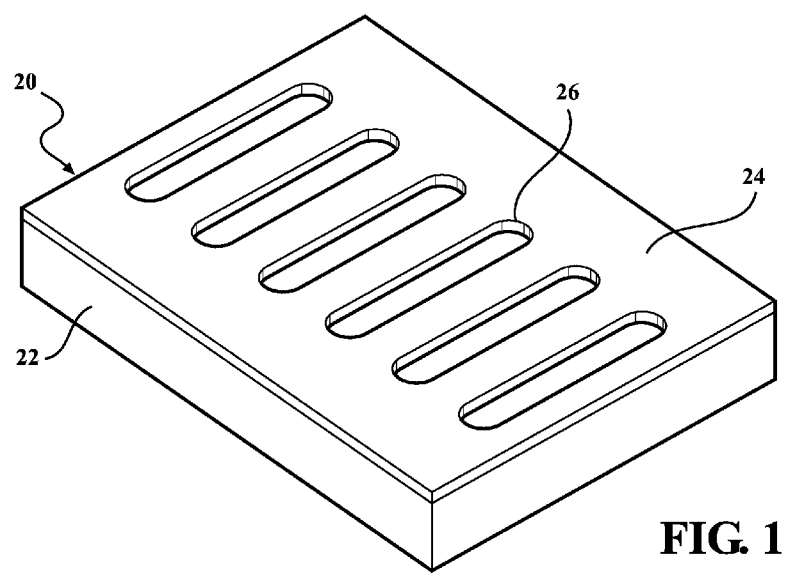
FIG. 1 is a schematic view of a friction control device according to one disclosed non-limiting embodiment.

FIG. 1 schematically illustrates a friction control device 20. The friction control device 20 generally includes an active material layer 22 and a slotted shield 24. Suitable active materials for the active material layer 22 include, without limitation, shape memory alloys (SMA), ferromagnetic shape memory alloys (MSMA), electroactive polymers (EAP), piezoelectric materials, magnetorheological (MR) elastomers, electrorheological (ER) elastomers, electrostrictive materials, magnetostrictive materials, and the like. Depending on the particular active material, the activation signal for the active material layer 22 can take the form of, without limitation, an electric current, an electric field (voltage), a temperature change, a magnetic field, a mechanical loading or stressing (such as stress induced superelasticity in SMA), a chemistry or pH change, and the like.

When actuated, the active material layer 22 may expand to, in one example, twice its thickness, but a variable thickness is readily achieved through control of the actuation signal such as through a variable current. Alternatively, the active material layer 22 is selectively contracted in response to the actuation signal.

Figure 2:
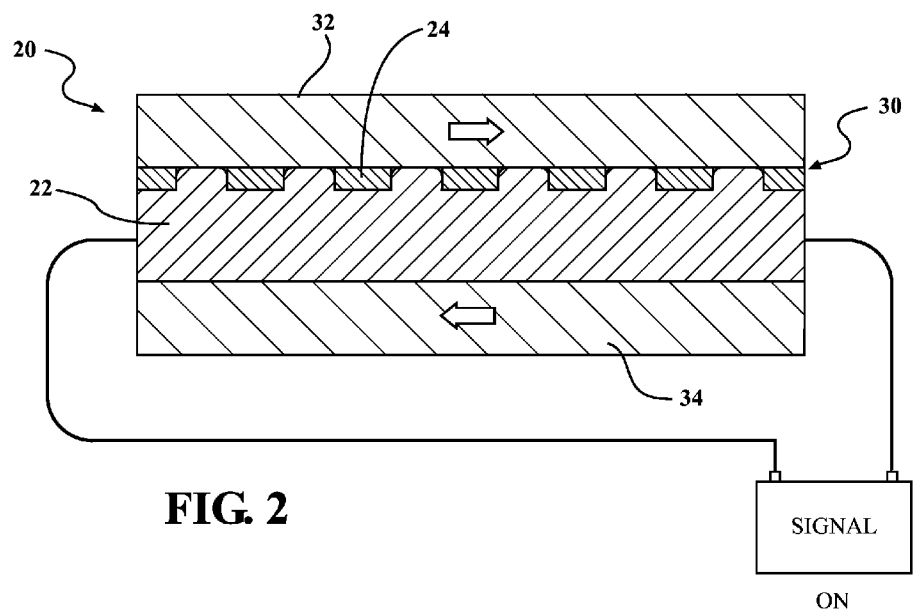
FIG. 2 is a schematic view of the friction control device in an activated condition.

The slotted shield 24, according to one disclosed non-limiting embodiment includes a multiple of slots 26 arranged through which the active material layer 22 extends when in the actuated condition (FIG. 2). It should be appreciated that although the multiple of slots 26 in the disclosed non-limiting embodiment are arranged in parallel, other relationships will benefit herefrom.

The multiple of slots 26 operate to stabilize and focus the active material layer 22 when actuated. That is, the active material layer 22 selectively extends at least partially through the multiple of slots 26 when in an actuated condition (FIG. 2) as compared to a deactivated condition (FIG. 3) in which the active material layer 22 does not extend—or extends to a lesser extent—through the multiple of slots 26 as compared to the actuated condition. The friction control device 20 thereby controls a frictional interface 30 to change a frictional force between a first component 32 and a second component 34.

The multiple of slots 26 may include slots of various widths W and/or lengths L 26-1, 26-2, 26-3 and combinations thereof (FIG. 4). That is, at least one of the multiple of slots 26 may includes a first slot having a width W and/or a length L different than a second of the multiple of slots 26. It should be appreciated that "slots" as defined herein includes various extended apertures of various configurations and geometries. Further, the multiple of slots 26 may be arranged in various patterns other than a rectilinear pattern such as, for example, a triangle (FIG. 5), a chevron (FIG. 6) or other shapes and/or patterns may be provided to further tailor the frictional force provided by the frictional interface 30.

Figure 7:
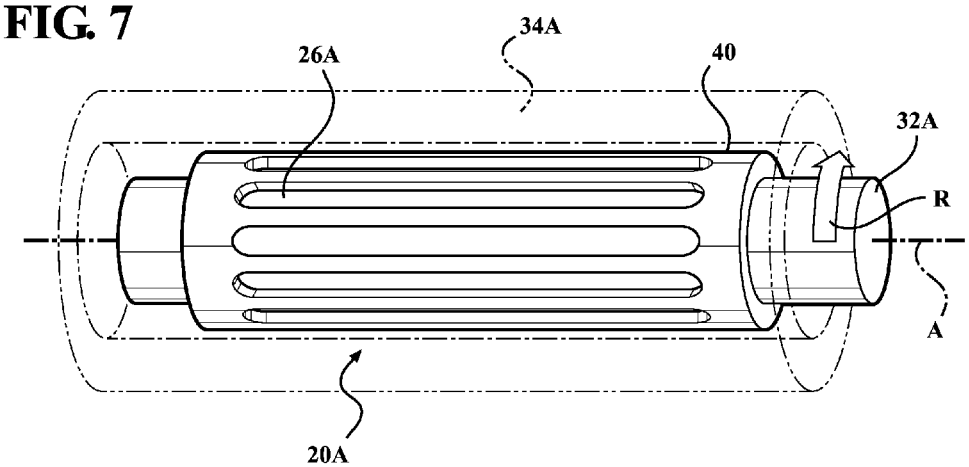
FIG. 7 is a schematic view of a friction control device in a rotary application.
Figure 8:
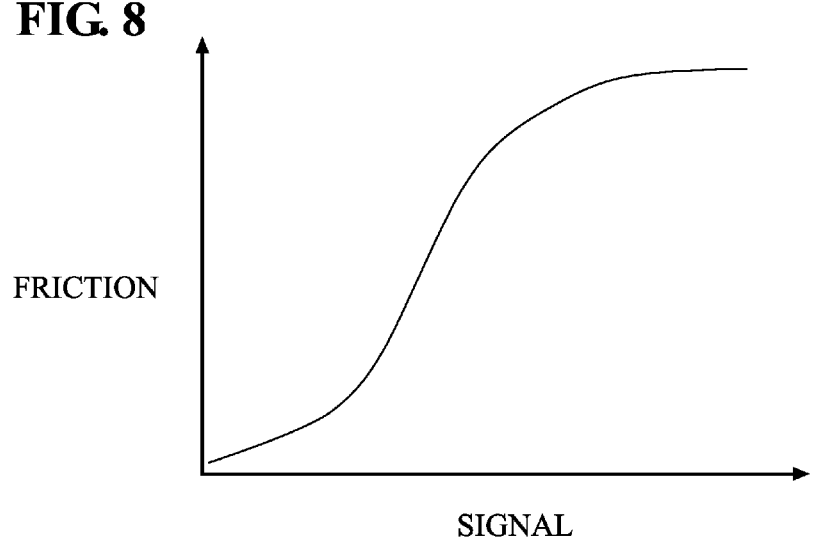
FIG. 8 is a graphical representation of a frictional force level with respect to an actuation signal provided to the friction control device.
Figure 9:
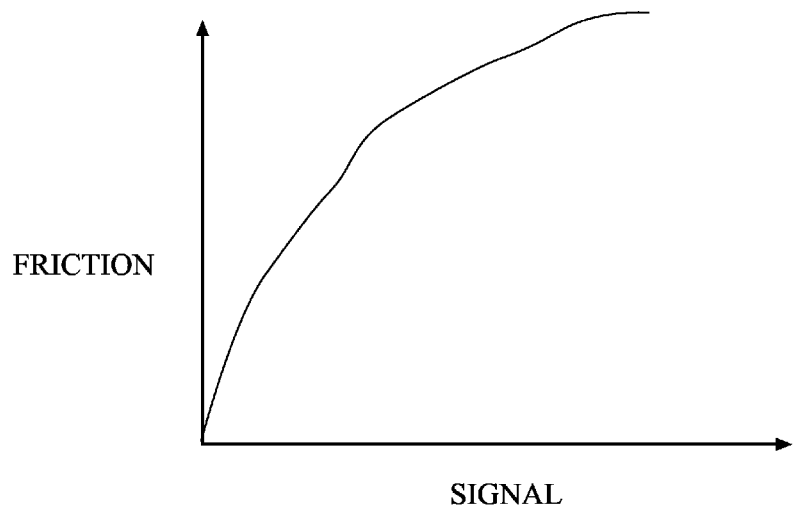
FIG. 9 is a graphical representation of a relative motion control with respect to the actuation signal provided to the friction control device.

With reference to FIG. 7, a friction control device 20A is located at a rotational frictional interface 40 between a first component 32A and a second component 34A. In this disclosed non-limiting embodiment, the first component 32A rotates relative to the second component 34A about an axis A. Selective actuation of the friction control device 20A operates to control the frictional force between the components 32A, 34A with respect to the activation signal (FIG. 8). This results in relative motion control, e.g., torque/force control with respect to the activation signal (FIG. 9). For example, an increased voltage results in an increased frictional force at the rotational frictional interference. It should be appreciated that particular slot shapes and arrangements may be selected to further tailor the frictional force.

Figure 10:
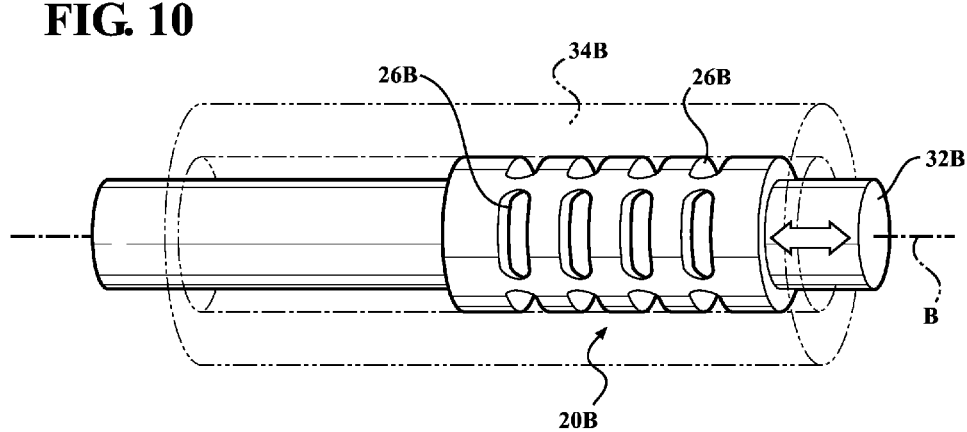
FIG. 10 is a schematic view of a slot orientation in the friction control device for a rotary application.

In this disclosed non-limiting embodiment, the first component 32A rotates relative to the second component 34A about the axis A and the slots 26A are arranged transverse to the direction of rotation (illustrated schematically by arrow R). That is, the slots 26A are arranged generally parallel to the axis A. In another disclosed non-limiting embodiment, the first component 32B slides relative to the second component 34B along an axis B and the slots 26B of the friction control device 20B are transverse to the axis B (FIG. 10).

Figure 11:
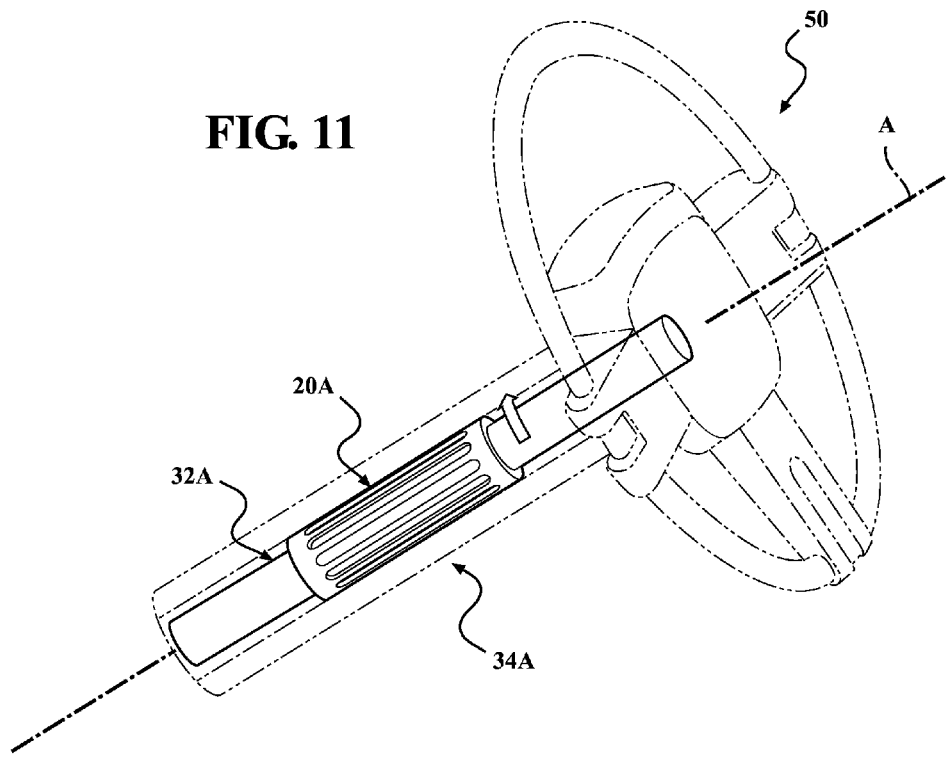
FIG. 11 is a schematic view of a steering wheel system application controlled by the friction control device.
Figure 12:
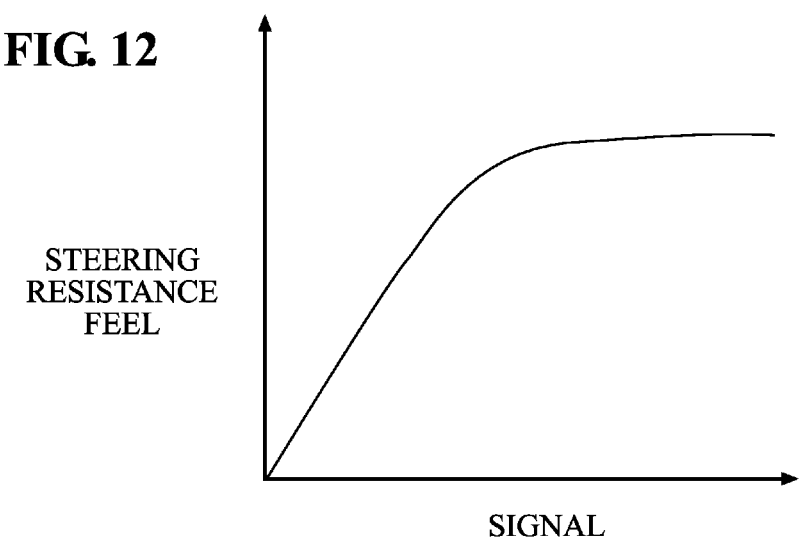
FIG. 12 is a graphical representation of a selective steering wheel resistance feel provided by the friction control device.

With reference to FIG. 11, the friction control device 20A may be utilized in an example steering system 50 application to facilitate a desired steering resistance feel in response to the activation signal (FIG. 12).

Figure 13:
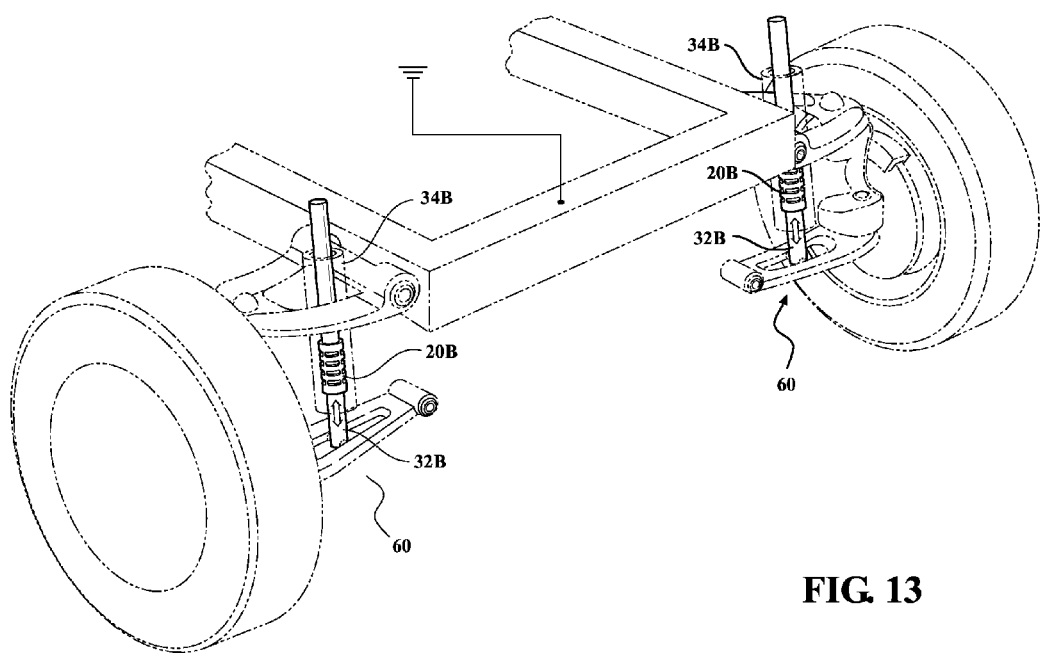
FIG. 13 is a schematic view of a suspension system application controlled by the friction control device.

With reference to FIG. 13, the friction control device 20B may be utilized in an example suspension system 60 application to facilitate a desired suspension effect such as hard, soft, etc., in response to the activation signal.

It should be appreciated that these are but illustrated examples, and that various systems may benefit herefrom.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A friction control device, comprising:
an active material layer; and
a shield defining a plurality of slots, each slot having a width and a length, the length being greater than the width, wherein:
at least a portion of said active material layer is selectively operable to expand through the plurality of slots; and
the slots are arranged such that a slot length direction is transverse to a movement direction of a component in frictional contact with at least one of the active material layer and the shield.

2. The device as recited in claim 1, wherein the slot length direction of two or more of the plurality of slots are arranged in parallel.

3. The device as recited in claim 2, wherein at least one of the plurality of slots includes a first slot of width different than that of a second of the plurality of slots.

4. The device as recited in claim 2, wherein at least one of the plurality of slots includes a first slot of a length different than that of a second of the plurality of slots.

5. The device as recited in claim 2, wherein at least one of the plurality of slots includes a first slot of a width and a length different than that of a second of the plurality of slots.

6. The device as recited in claim 2, wherein the plurality of slots define a rectilinear pattern.

7. The device as recited in claim 2, wherein the plurality of slots define a triangle pattern.

8. The device as recited in claim 2, wherein the plurality of slots define a chevron pattern.

9. The device as recited in claim 1, wherein said active material layer includes an electroactive polymer.

10. A system, comprising:
a first component;
a second component movable with respect to said first component;
a friction control device between said first component and said second component, said friction control device including:
an active material layer; and
a shield defining a plurality of slots, each slot having a width and a length, the length being greater than the width, wherein:
at least a portion of said active material layer is selectively operable to change a frictional force between said first component and said second component; and
the slots are arranged such that a slot length direction is transverse to a movement direction of the second component with respect to the first component.

11. The system as recited in claim 10, wherein said second component rotates with respect to said first component around an axis.

12. The system as recited in claim 11, wherein the slot length direction is parallel to said axis.

13. The system as recited in claim 11, wherein the first component and the second component are vehicle steering system components for a vehicle.

14. The system as recited in claim 10, wherein said second component slides with respect to said first component along an axis.

15. The system as recited in claim 14, wherein said slotted shield includes a multiple of slots transverse to said axis.

16. The system as recited in claim 14, wherein the first component and the second component are vehicle suspension system components.

17. A method for controlling a frictional interface between a first component and a second component, the method comprising:
   selectively controlling an active material through a plurality of slots defined in a shield to change a frictional force between the first component and the second component, each slot having a width and a length, the length being greater than the width, and the plurality of slots being arranged such that a slot length direction is transverse to a movement direction of the second component.

18. The method as recited in claim 17, further comprising:
   selectively expanding the active material through the plurality of slots.

19. The method as recited in claim 17, further comprising:
   selectively expanding the active material through the plurality of slots parallel to an axis about which the first component rotates relative to the second component.

20. The method as recited in claim 17, further comprising:
   selectively expanding the active material through the plurality of slots transverse to an axis about which the first component slides relative to the second component.

\* \* \* \* \*